(12) United States Patent
Kim (10) Patent No.: US 9,785,015 B1
(45) Date of Patent: Oct. 10, 2017

(54) DISPLAY APPARATUS, AND METHOD OF FORMING POST SPACER IN DISPLAY APPARATUS

(71) Applicant: Hydis Technologies Co., Ltd., Icheon-si, Gyeonggi-do (KR)

(72) Inventor: Hye Lyn Kim, Suwon-si (KR)

(73) Assignee: HYDIS TECHNOLOGIES CO., LTD., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/621,412

(22) Filed: Jun. 13, 2017

Related U.S. Application Data (62) Division of application No. 15/010,221, filed on Jan. 29, 2016.

(30) Foreign Application Priority Data

Jan. 30, 2015 (KR) .......... 10-2015-0014946

(51) Int. Cl.
  *G02F 1/1339* (2006.01)
  *G02F 1/1341* (2006.01)

(52) U.S. Cl.
  CPC ........ *G02F 1/13394* (2013.01); *G02F 1/1341* (2013.01)

(58) Field of Classification Search
  CPC .............. G02F 1/1341; G02F 1/13394
  See application file for complete search history.

(56) References Cited

U.S. PATENT DOCUMENTS

| 6,320,639 | B1* | 11/2001 | Mori ................. | G02F 1/133514 349/129 |
| 6,337,730 | B1* | 1/2002 | Ozaki ................ | G02F 1/13394 349/156 |
| 2002/0075443 | A1* | 6/2002 | Shimizu ............ | G02F 1/13394 349/155 |
| 2008/0151133 | A1* | 6/2008 | Kim .................... | G02F 1/13338 349/12 |
| 2015/0316807 | A1* | 11/2015 | Cai ..................... | G02F 1/13394 428/1.54 |
| 2016/0282655 | A1* | 9/2016 | Yu ...................... | G02F 1/13394 |
| 2017/0097532 | A1* | 4/2017 | Tang .................. | G02F 1/13394 |

FOREIGN PATENT DOCUMENTS

KR  10-2013-0039383 A  4/2013

* cited by examiner

*Primary Examiner* — James Dudek
(74) *Attorney, Agent, or Firm* — Rabin & Berdo, P.C.

(57) ABSTRACT

A method of forming a plurality of post spacers between an upper substrate and lower substrate in a display apparatus comprises: applying a resin layer on an upper portion of the upper substrate or the lower substrate; arranging a plurality of through-hole forming bodies on an upper portion of the resin layer; applying a resin layer again on an upper portion of the resin layer where the plurality of through-hole forming bodies have been arranged; exposing the applied resin layer to light using a mask; removing areas other than areas where post spacers are to be formed from the applied resin layer; and removing the plurality of through-hole forming bodies from the areas where the post spacers are to be formed.

12 Claims, 7 Drawing Sheets

PRIOR ART

DISPLAY APPARATUS, AND METHOD OF FORMING POST SPACER IN DISPLAY APPARATUS

CROSS-REFERENCE TO RELATED APPLICATION

This application is a divisional application of co-pending U.S. application Ser. No. 15/010,221, filed Jan. 29, 2016, the disclosure of which is incorporated herein by reference. This application claims priority benefits under 35 U.S.C. §1.119 to Korean Patent Application No. 10-2015-0014946 filed Jan. 30, 2015.

BACKGROUND

1. Field

The following description relates to a display apparatus, and more particularly, to a display apparatus having a post spacer capable of reducing the time it takes to fill liquid crystal and a method of forming the post spacer in the display apparatus.

2. Description of Related Art

In a general liquid crystal display, if a liquid crystal layer disposed between a CF (Color Filter) substrate and a TFT (Thin Film Transistor) substrate is not maintained at a constant thickness, defects may occur in the viewing angle and response speed and the like. Therefore, in order to maintain a constant gap between the CF substrate and TFT substrate, a post spacer (hereinafter referred to as PS) is arranged between the CF substrate and TFT substrate.

A liquid crystal filling process is a process of filling an orientation film between a CF substrate and TFT substrate with liquid crystal. Examples of the liquid crystal filling process include a dipping method of dipping a liquid crystal filling inlet provided on one side of a liquid crystal panel into a liquid crystal material contained in a liquid crystal plate so that the liquid crystal may be filled into the panel using the capillary tube effect, and an ODF (One Drop Filling) method of dropping a liquid crystal material into a seal pattern of a glass substrate at one side and then bonding another substrate thereon. Due to the recent trends toward larger LCD screens, it is taking more time to fill liquid crystal, which is a problem.

Figure 1:
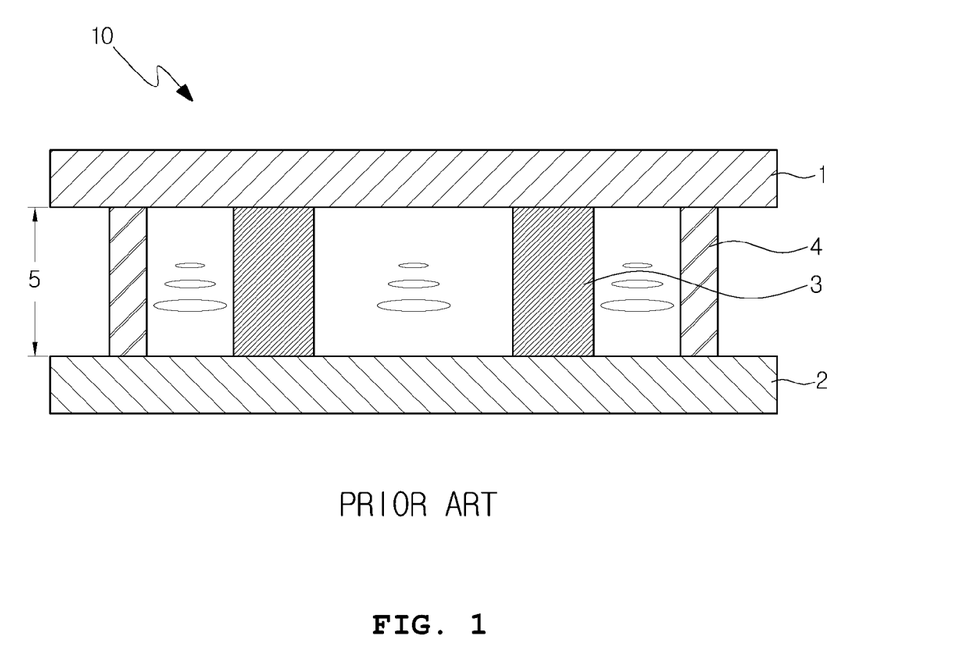
FIG. 1 is an exemplary view illustrating a conventional liquid crystal panel having a post spacer.

FIG. 1 is an exemplary view illustrating a conventional liquid crystal panel having a post spacer. Referring to FIG. 1, a liquid crystal panel 10 includes a CF substrate 1, TFT substrate 2, sealant 4 arranged on edges of the CF substrate 1 and TFT substrate 2 to seal the inside of the liquid crystal panel from outside, and a plurality of post spacers 3 configured to maintain a certain gap 5 between the CF substrate 1 and TFT substrate 2. The plurality of post spacers 3 are positioned between the CF substrate 1 and TFT substrate 2. The plurality of post spacers 3 are arranged in certain intervals such that they can withstand external pressure such as the impact and pressure applied from outside towards inside the liquid crystal panel 10, and both ends of a post spacer contact the CF substrate 1 and TFT substrate 2. More specifically, the plurality of post spacers 3 may consist of main post spacers (not illustrated) for maintaining a certain gap between the CF substrate 1 and TFT substrate 2, and sub post spacers (not illustrated) for serving as supports against external pressure. When filling liquid crystal in a liquid crystal filling process, such a conventional plurality of post spacers 3 interrupt the flow of liquid crystal being filled, thereby delaying the filling time of the liquid crystal.

SUMMARY

A purpose of the present disclosure is to resolve the aforementioned problems of prior art, that is, to provide a display apparatus configured not to interrupt the flow of liquid crystal being filled in a liquid crystal filling process, and a method for forming a post spacer in the display apparatus.

Another purpose of the present disclosure is to provide a display apparatus configured to prevent a bubble effect from occurring when there are bubbles left inside a panel or when the liquid crystal is insufficiently filled after a liquid crystal filling process in a process of producing a liquid crystal display apparatus, and a method for forming a post spacer in the display apparatus.

According to an aspect, there is provided a display apparatus including a plurality of post spacers positioned between an upper substrate and lower substrate, wherein at least some of the plurality of post spacers are provided with through-holes in bodies thereof, the through-holes of some of the post spacers having different diameters or directions from through-holes of the other post spacers.

Of among the post spacers provided with the through-holes in bodies thereof, a diameter of a through-hole of a post spacer close to a liquid crystal filling position may be greater than a diameter of a through-hole of a post spacer far away from the liquid crystal filling position.

Of among the post spacers provided with the through-holes in bodies thereof, a diameter of a through-hole of a post spacer close to a liquid crystal filling position may be smaller than a diameter of a through-hole of a post spacer far away from the liquid crystal filling position.

Of among the post spacers provided with the through-holes in bodies thereof, a greater number of through-holes may be formed in a post spacer close to a liquid crystal filling position than the number of through-holes in a post spacer far away from the liquid crystal filling position.

Of among the post spacers provided with the through-holes in bodies thereof, a smaller number of through-holes may be formed in a post spacer close to a liquid crystal filling position than the number of through-holes in a post spacer far away from the liquid crystal filling position.

A direction of the through-hole may be formed to correspond to a direction in which liquid crystal spreads when being filled.

According to another aspect, there is provided a method of forming a plurality of post spacers between an upper substrate and lower substrate in a display apparatus, the method including applying a resin layer on an upper portion of the upper substrate of the lower substrate; arranging a plurality of through-hole forming bodies on an upper portion of the resin layer; applying a resin layer again on an upper portion of the resin layer where the plurality of through-hole forming bodies have been arranged; exposing the applied resin layer to light using a mask; removing areas other than areas where post spacers are to be formed from the applied resin layer; and removing the plurality of through-hole forming bodies from the areas where the post spacers are to be formed.

At the step of arranging a plurality of through-hole forming bodies, a through-hole forming body having a greater diameter is arranged close to a liquid crystal filling position than a through-hole forming body having a smaller diameter.

At the step of arranging a plurality of through-hole forming bodies, a through-hole forming body having a greater diameter is arranged far away from a liquid crystal filling position than a through-hole forming body having a smaller diameter.

At the step of arranging a plurality of through-hole forming bodies, a greater number of through-hole forming bodies are arranged close to a liquid crystal filling position than the number of through-hole forming bodies far away from the liquid crystal filling position such that a greater number of through-holes are formed in a post spacer close to a liquid crystal filling position than the number of through-holes in a post spacer far away from the liquid crystal filling position.

At the step of arranging a plurality of through-hole forming bodies, a greater number of through-hole forming bodies are arranged far away from a liquid crystal filling position than the number of through-hole forming bodies close to the liquid crystal filling position such that a greater number of through-holes are formed in a post spacer far away from the liquid crystal filling position than the number of through-holes in a post spacer close to the liquid crystal filling position.

The method may further include further arranging at least one through-hole forming body on an upper portion of the applied resin layer; and applying a resin layer again on an upper portion of the resin layer where the at least one through-hole forming body has been arranged, wherein the above additional steps may be repeated at least once before exposing the applied resin layer to light using a mask, so as to form through-holes having different heights.

At the step of arranging a plurality of through-hole forming bodies, the through-holes forming bodies are arranged in a direction corresponding to a direction in which liquid crystal spreads when being filled.

According to the embodiments of the present disclosure, it is possible to form through-holes in bodies of at least some of a plurality of post spacers such that the post spacers do not interrupt the flow of liquid crystal being filled in a liquid crystal filling process, thereby reducing the filling time of liquid crystal.

Furthermore, according to the embodiments of the present disclosure, since the liquid crystal being filled in a liquid crystal filling process can flow smoothly due to the through-holes formed in the bodies of at least some of the plurality of post spacers, the low temperature bubble effect may be prevented from occurring when there are bubbles left inside a liquid crystal panel or when the liquid crystal is insufficiently filled after a liquid crystal filling process.

DETAILED DESCRIPTION

Hereinafter, exemplary embodiments of the present disclosure will be explained in detail with reference to the illustrations in the drawings attached hereto. However, the present disclosure is not limited by the exemplary embodiments. The like reference numerals indicate the like components throughout the drawings attached.

Terms including ordinal numbers such as "first", "second" and the like may be used to explain various components, but the components are not limited by those terms. These terms are only intended to differentiate one component from other components. For example, a first component may be referred to as a second component without departing from the scope of right of the present disclosure. Likewise, a second component may be referred to as a first component. The terms used in the present application are only intended to explain a certain embodiment, and not to limit the present disclosure. Furthermore, the terms used in a singular form may include a plural form unless clearly meaning otherwise in the context.

Furthermore, throughout the present specification, "include/comprise" or "including/comprising" means that components may be further added without excluding possibility of existence of other components.

For better understanding of a display apparatus of the present disclosure and a method of forming a post spacer of the display apparatus, explanation will be made based on an assumption that the display apparatus is a liquid crystal display apparatus.

Hereinafter, explanation will be made on a post spacer where a through-hole is formed according to an embodiment of the present disclosure with reference to the drawings attached.

Figure 2:
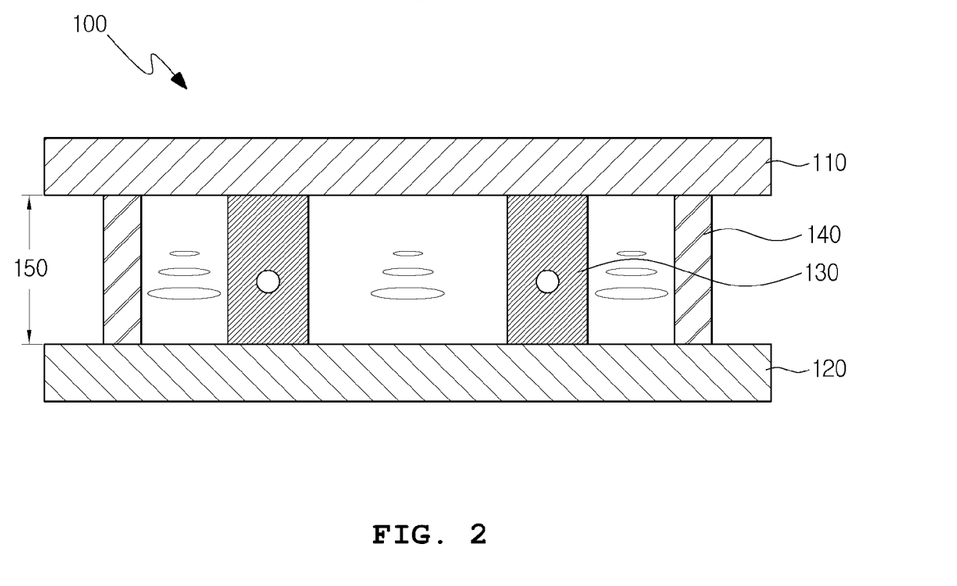
FIG. 2 is an exemplary view illustrating a liquid crystal panel having a plurality of post spacers according to an embodiment of the present disclosure.

FIG. 2 is an exemplary view illustrating a liquid crystal panel provided with a plurality of post spacers according to an embodiment of the present disclosure, and FIG. 3 is an exemplary view illustrating a post spacer according to an embodiment of the present disclosure.

Referring to FIG. 2, a liquid crystal panel according to an embodiment of the present disclosure 100 may include an upper substrate 110, lower substrate 120, sealant 140 and a plurality of post spacers 130. Herein, the sealant 140 is arranged on edges of the upper substrate 110 and lower substrate 120 so as to seal the inside of the liquid crystal panel 100 from outside. The plurality of post spacers 130 basically maintains the gap 150 between the upper substrate 110 and lower substrate 120. Herein, the upper substrate 110 may be a certain substrate of either a TFT substrate or CF substrate, while the lower substrate 120 is the other one of the TFT substrate and CF substrate.

Figure 3A:
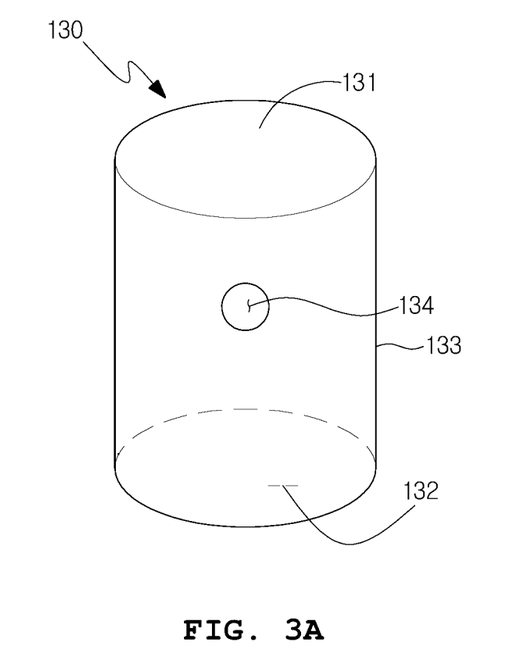
FIGS. 3A and 3B are exemplary views illustrating a post spacer according to an embodiment of the present disclosure.
Figure 3B:
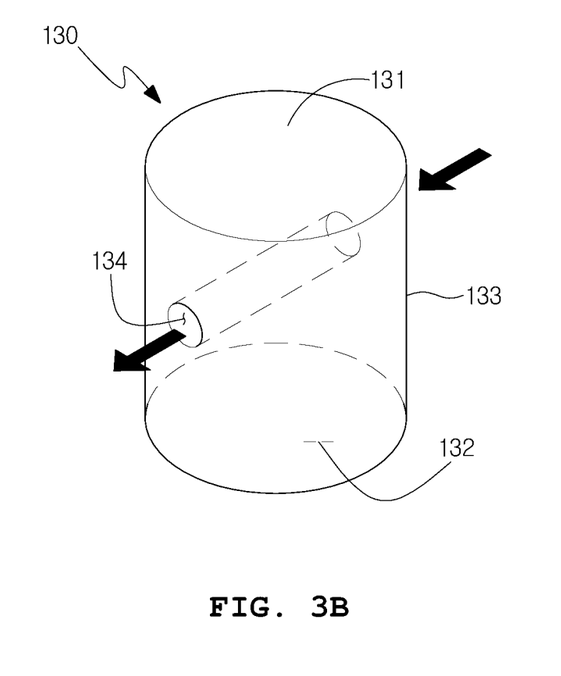

Referring to FIG. 3A and 3B, a post spacer 130 according to an embodiment of the present disclosure may be provided with at least one through-hole 134 unlike the conventional post spacer 3 explained with reference to FIG. 1.

More specifically, one surface 131 of the post spacer 130 may contact the upper substrate 110, while another surface 132 may contact the lower substrate 120. At least one through-hole 134 may be formed in a body 133 of the post spacer 130. Through at least one through-hole 134 formed in the body 133 of the post spacer 130, the liquid crystal being filled in a liquid crystal filling process may be filled smoothly. Therefore, a liquid crystal panel 100 according to an embodiment of the present disclosure may reduce the filling time of the liquid crystal compared to a conventional liquid crystal panel 10.

Furthermore, since the liquid crystal panel 100 according to an embodiment of the present disclosure allows liquid crystal to flow smoothly in a liquid crystal filling process through at least one through-hole 134 formed in some of the plurality of post spacers 130, the liquid crystal may be filled evenly across each part compared to a conventional liquid crystal panel 10.

Hereinafter, a method of forming a plurality of post spacers according to an embodiment of the present disclosure will be explained with reference to the drawings attached.

FIGS. 4 to 7 are exemplary views illustrating a method of forming a plurality of post spacers according to an embodiment of the present disclosure.

Figure 4:
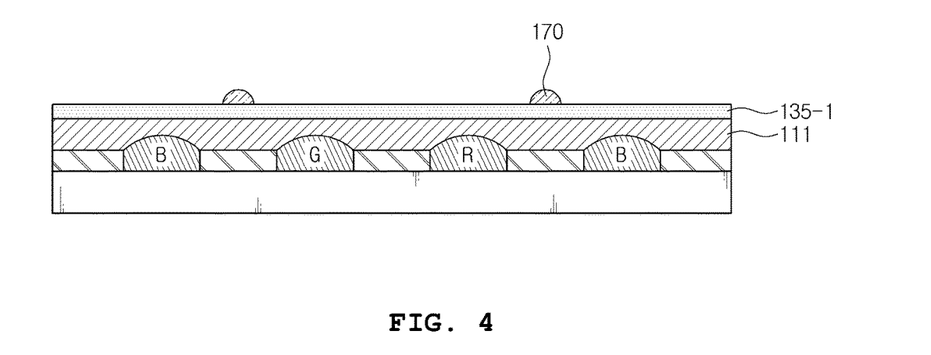
FIGS. 4 to 7 are exemplary views illustrating a method of forming a plurality of post spacers according to an embodiment of the present disclosure.

Referring to FIG. 4, in order to form a through-hole in some of the plurality of post spacers according to an embodiment of the present disclosure, first of all, a resin layer 135-1 may be applied on an upper portion of an over coating layer 111 of an upper substrate. Although the resin layer 135-1 is applied on an upper portion of the over coating layer 111 in FIG. 4, there is no limitation thereto, and thus the resin layer 135-1 may be applied on an upper portion of an upper substrate or a lower substrate.

Then, a plurality of through-hole forming bodies 170 may be arranged on an upper portion of the resin layer 135-1.

More specifically, the plurality of through-hole forming bodies 170 may each be arranged on each area on the resin layer 135-1 where a post spacer 130 is to be formed.

Herein, the same number of through-hole forming bodies 170 may be arranged as the number of through-holes 134 to be formed on areas on the resin layer 135-1 where the post spacers 130 are to be formed.

Furthermore, the plurality of through-hole forming bodies 170 may be made of a metal material of a line format.

Then, on an upper portion of the resin layer 135-1 where the plurality of through-hole forming bodies 170 are arranged, a resin layer 135-2 may be applied again.

Figure 5:
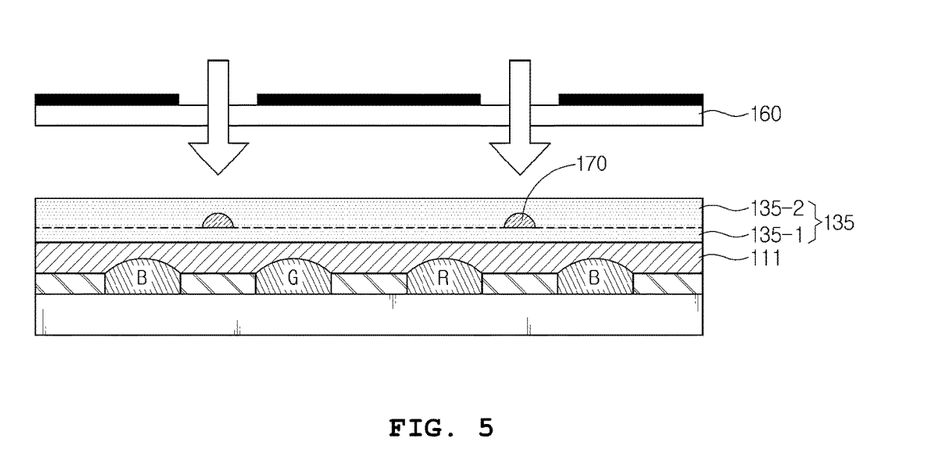

Then, the resin layer 135 applied may be exposed to light using a mask 160, as illustrated in FIG. 5.

Figure 6:
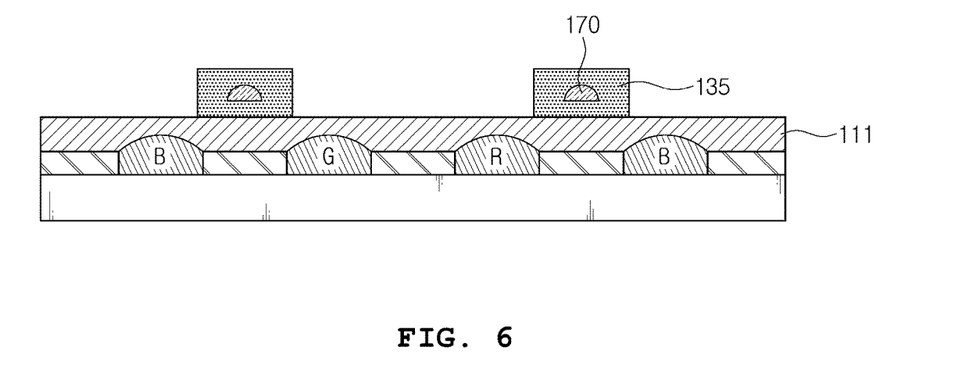

Then, referring to FIG. 6, a step of removing areas of the applied resin layer 135 other than areas where post spacers are to be formed may be performed.

More specifically, the areas of the applied resin layer 135 other than areas where post spacers are to be formed may be removed by a dry etching method.

Figure 7:
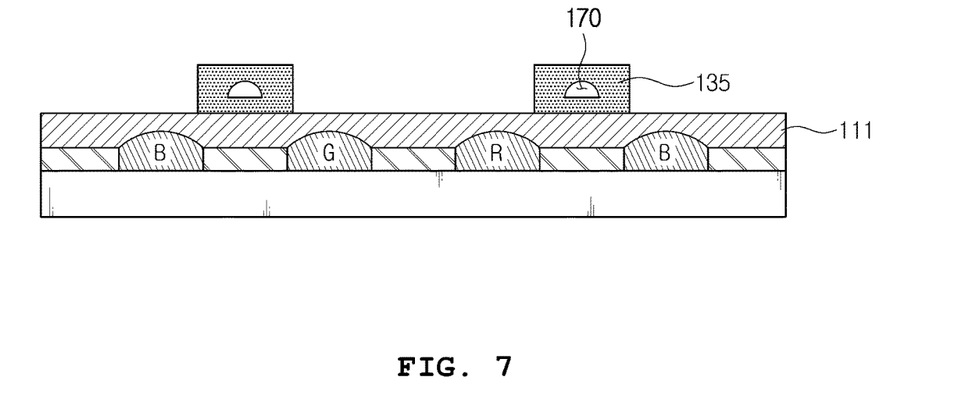

Then, referring to FIG. 7, from the areas where post spacers are to be formed of the applied resin layer 135, the plurality of through-hole forming bodies 170 may be removed.

More specifically, from the areas where post spacers are to be formed of the applied resin layer 135, the plurality of through-hole forming bodies 170 may be removed by a wet etching method.

Meanwhile, although it was explained with reference to FIGS. 2 to 7 that a single through-hole 134 is formed in a body 133 of a post spacer 130, there is no limitation thereto, and thus a plurality of through-holes may be formed in the body 133 of the post spacer 130.

More specifically, prior to the step of exposing the resin layer to light in the method of forming a plurality of post spacers according to an embodiment of the present disclosure explained with reference to FIGS. 2 to 7, a step of further arranging at least one through-hole forming body on an upper portion of the applied resin layer and a step of applying a resin layer again on an upper portion of the applied resin layer on which at least one through-hole forming body has been further arranged may be repeated more than once so as to produce post spacers having through-holes of different heights. By this method, a plurality of through-holes 134 may be formed in a body 133 of a post spacer 130, the through-holes 134 distanced by a certain gap from each other but distanced by different distances from one surface 131 or another surface 132 of each post spacer 130.

Furthermore, by the aforementioned method, a plurality of through-holes 134 may be formed on a same plane of a body 133 of a post spacer 130, the through-holes 134 distanced by a certain gap from each other and arranged in a horizontal direction.

Hereinafter, explanation will be made on diameters of the through-holes 134 that vary based on a position where liquid crystal is filled.

FIG. 8 shows exemplary views illustrating diameters of through-holes that vary based on a liquid crystal filling position according to an embodiment of the present disclosure.

Figure 8A:
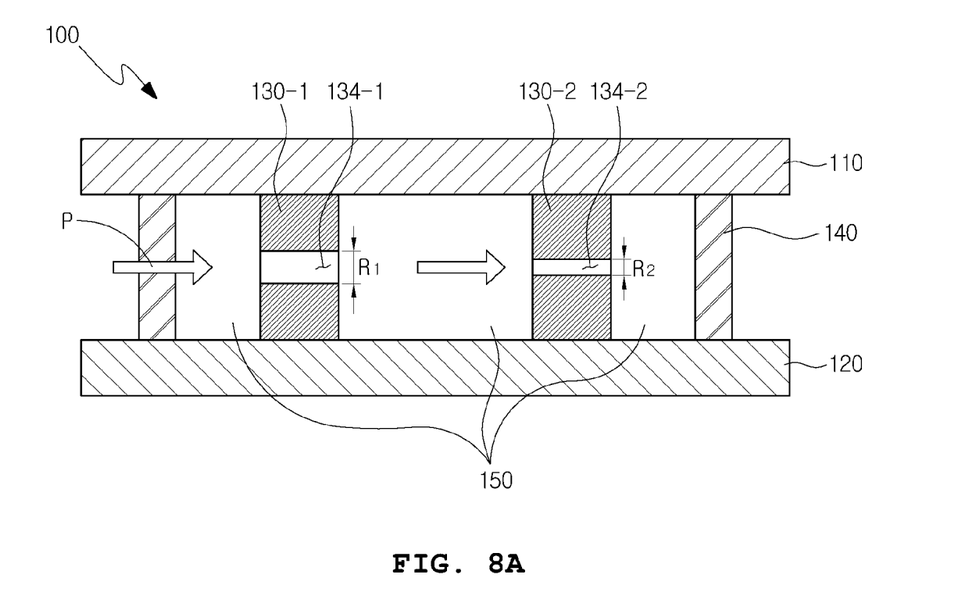
FIGS. 8A and 8B show exemplary views illustrating diameters of through-holes based on a liquid crystal filling position according to an embodiment of the present disclosure.

Referring to FIG. 8A, the diameter $R_1$ of a through-hole 134-1 formed in a post spacer 130-1 positioned close to a liquid crystal filling position P may be formed to be greater than the diameter $R_2$ of a through-hole 134-2 formed in a post spacer 130-2 positioned far away from the liquid crystal filling position P.

More specifically, by forming the diameter $R_1$ of the through-hole 134-1 formed in the post spacer 130-1 positioned close to the liquid crystal filling position P to be greater than the diameter $R_2$ of the through-hole 134-2 formed in the post spacer 130-2 positioned far away from the liquid crystal filling position P, it is possible to fill the liquid crystal evenly to where it is far away from the liquid crystal filling position P during a liquid crystal filling process. This is because the through-holes formed in at least one post spacer are formed to have different diameters from one another such that the flow of the liquid crystal is not interrupted during a liquid crystal filling process.

Furthermore, a greater number of through-holes 134-1 may be formed in the post spacer 130-1 close to the liquid crystal filling position P than the number of the through-holes 134-2 formed in the post spacer 130-2 positioned far away from the liquid crystal filling position P.

More specifically, when a greater number of through-holes 134-1 are formed in the post spacer 130-1 close to the liquid crystal filling position P than the number of the through-holes 134-2 formed in the post spacer 130-2 positioned far away from the liquid crystal filling position P, it is possible to fill the liquid crystal evenly to where it is far away from the liquid crystal filling position P during a liquid crystal filling process. This is because different numbers of through-holes are formed in at least one post spacer such that the flow of the liquid crystal is not interrupted during a liquid crystal filling process.

Figure 8B:
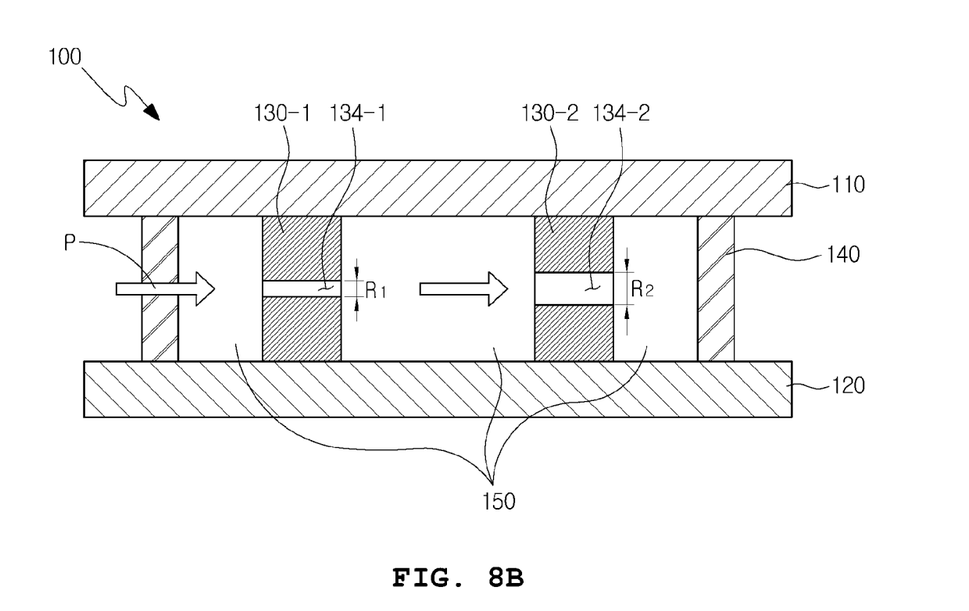

In another example, referring to FIG. 8B, the diameter $R_2$ of a through-hole 134-2 formed in a post spacer 130-2 positioned far away from a liquid crystal filling position P may be formed to be greater than the diameter $R_1$ of a through-hole 134-1 formed in a post spacer 130-1 positioned close to the liquid crystal filling position P.

More specifically, by forming the diameter R2 of the through-hole 134-2 formed in the post spacer 130-2 positioned far away from the liquid crystal filling position P to be greater than the diameter $R_1$ of the through-hole 134-1 formed in the post spacer 130-1 positioned close to the liquid crystal filling position P, it is possible to fill the liquid crystal evenly to where it is far away from the liquid crystal filling position P even when the flow of the liquid crystal is slow during a liquid crystal filling process. This is because the disadvantage of the flow of the liquid crystal becoming slower as it is farther away from the liquid crystal filling position P may be compensated by forming the diameter R2 of the through-hole 134-2 formed in the post spacer 130-2 positioned far away to be greater than the diameter $R_1$ of the through-hole 134-1 formed in the post spacer 130-1 positioned close to the liquid crystal filling position P. Therefore, it is possible to prevent the liquid crystal from being filled insufficiently even when the flow of the liquid crystal is slow in a liquid crystal filling process.

Furthermore, a greater number of through-holes 134-2 may be formed in the post spacer 130-2 far away from the liquid crystal filling position P than the number of through-holes 134-1 formed in the post spacer 130-1 positioned close to the liquid crystal filling position P.

More specifically, when a greater number of through-holes 134-2 are formed in the post spacer 130-2 far away from the liquid crystal filling position P than the number of through-holes 134-1 formed in the post spacer 130-1 positioned close to the liquid crystal filling position P, it is possible to fill the liquid crystal evenly to where it is far away from the liquid crystal filling position P even when the flow of the liquid crystal is slow during a liquid crystal filling process. This is because the disadvantage of the flow of the liquid crystal becoming slower as it is farther away from the liquid crystal filling position P may be compensated by forming a greater number of through-holes 134-2 in the post spacer 130-2 positioned far away from the liquid crystal filling position P than the number of through-holes 134-1 in the post spacer 130-1 close to the liquid crystal filling position P.

The size of the diameter of the through-hole 134 formed in the post spacer explained with reference to FIGS. 8A and 8B may be adjusted using the size of the diameter of the through-hole forming body 170 arranged on an upper portion of the first post spacer resin layer 135-1 explained with reference to FIG. 5.

Next, explanation will be made on a direction of the through-hole 134 being formed in a body of a post spacer to correspond to the liquid crystal filling position with reference to FIG. 9.

FIG. 9 show exemplary views illustrating a direction of a through-hole being formed to correspond to a direction in which liquid crystal spreads when filling the liquid crystal according to an embodiment of the present disclosure.

Referring to FIG. 9, directions of through-holes 134 formed in some of the plurality of post spacers may correspond to directions in which liquid crystal spreads when filling the liquid crystal according to an embodiment of the present disclosure.

More specifically, the through-holes 134 in some of the plurality of post spacers may be formed to have directions corresponding to directions in which liquid crystal spreads from the liquid crystal filling position towards an end of the liquid crystal panel.

Figure 9A:
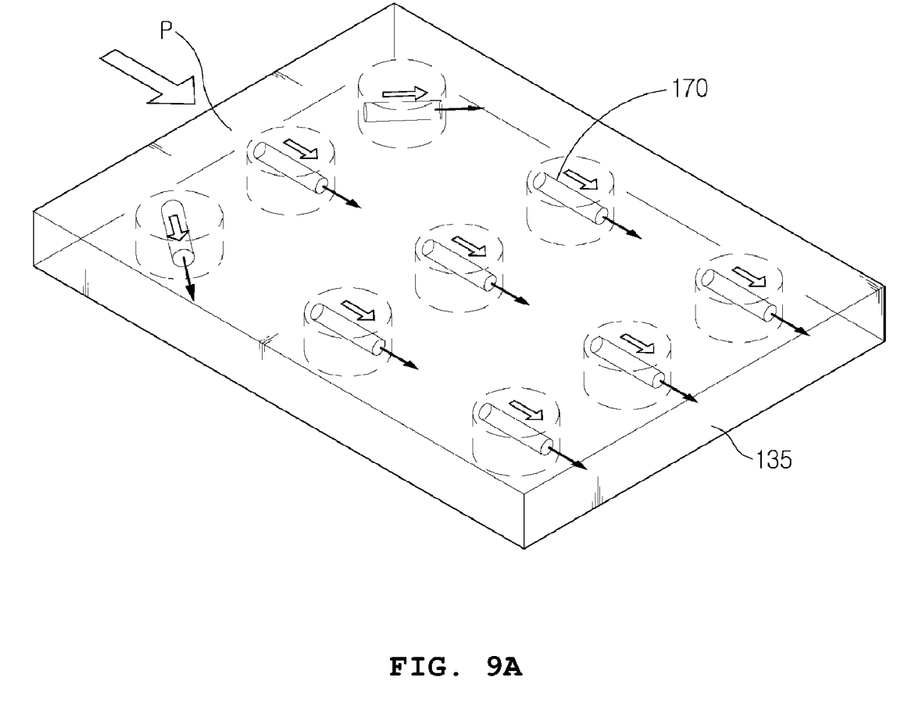
FIGS. 9A and 9B show exemplary views illustrating directions of through-holes corresponding to directions of the flow of liquid crystal when filling liquid crystal according to an embodiment of the present disclosure.

Referring to FIG. 9A, when the liquid crystal filling position is at one side of the liquid crystal panel, the liquid crystal spreads from the liquid crystal filling position to the end of the liquid crystal panel in a fan-shaped direction. Therefore, through-holes of some of the plurality of post spacers inside the liquid crystal panel may be formed in a direction corresponding to the fan-shaped direction from the liquid crystal filling position.

Figure 9B:
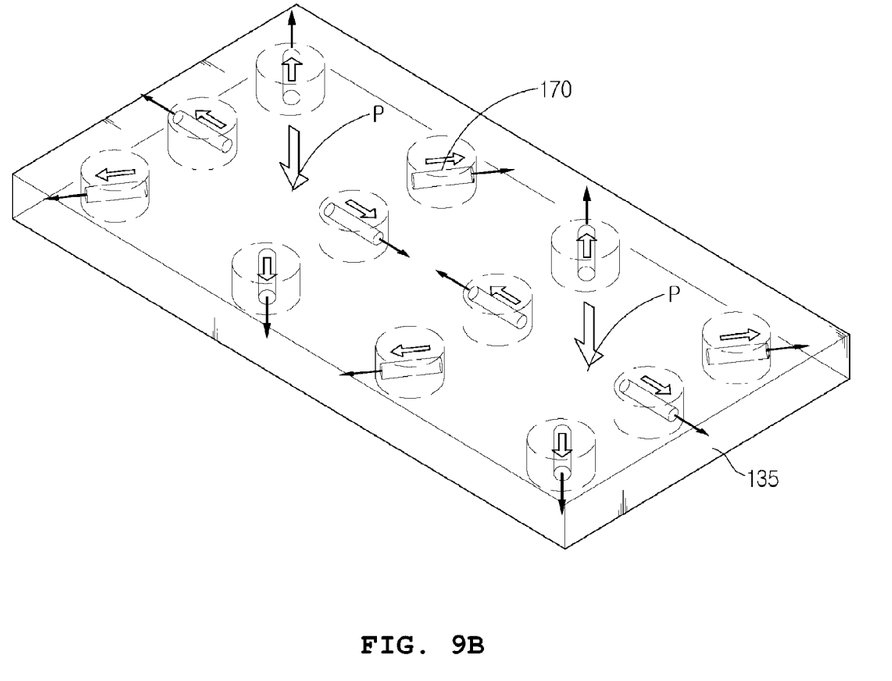

In another example, referring to FIG. 9B, when the liquid crystal filling position is at an upper portion of the liquid crystal panel, the liquid crystal spreads from the liquid crystal filling position to an end of the liquid crystal panel in a circular direction. Through-holes of some of the plurality of post spacers inside the liquid crystal panel may be formed in a direction corresponding to the circular direction from the liquid crystal filling position.

The direction of the through-hole 4 formed in the post spacer explained with reference to FIG. 9 may be adjusted by the direction of the through-hole forming body 170 arranged on an upper portion of the first post spacer resin layer 135-1 explained with reference to FIG. 5.

Only certain characteristics of the present disclosure are illustrated and explained in the present specification, and various modifications and changes can be made by one skilled in the art. Therefore, it will be understood that the claims are intended to include changes and modifications within the spirit and scope of the present disclosure.

What is claimed is:

1. A method of forming a plurality of post spacers between an upper substrate and lower substrate in a display apparatus, the method comprising:
    applying a resin layer on an upper portion of the upper substrate or the lower substrate;
    arranging a plurality of through-hole forming bodies on an upper portion of the resin layer;
    applying a resin layer again on an upper portion of the resin layer where the plurality of through-hole forming bodies have been arranged;
    exposing the applied resin layer to light using a mask;
    removing areas other than areas where post spacers are to be formed from the applied resin layer; and
    removing the plurality of through-hole forming bodies from the areas where the post spacers are to be formed.

2. The method of claim 1, wherein at the step of arranging a plurality of through-hole forming bodies,
    a through-hole forming body having a greater diameter is arranged close to a liquid crystal filling position than a through-hole forming body having a smaller diameter.

3. The method of claim 1, wherein at the step of arranging a plurality of through-hole forming bodies,
    a through-hole forming body having a greater diameter is arranged far away from a liquid crystal filling position than a through-hole forming body having a smaller diameter.

4. The method of claim 1, wherein at the step of arranging a plurality of through-hole forming bodies,
    a greater number of through-hole forming bodies are arranged close to a liquid crystal filling position than the number of through-hole forming bodies far away from the liquid crystal filling position such that a greater number of through-holes are formed in a post spacer close to a liquid crystal filling position than the number of through-holes in a post spacer far away from the liquid crystal filling position.

5. The method of claim 1, wherein at the step of arranging a plurality of through-hole forming bodies,
    a greater number of through-hole forming bodies are arranged far away from a liquid crystal filling position than the number of through-hole forming bodies close to the liquid crystal filling position such that a greater number of through-holes are formed in a post spacer far away from the liquid crystal filling position than the number of through-holes in a post spacer close to the liquid crystal filling position.

6. The method of claim 1, further comprising,
further arranging at least one through-hole forming body on an upper portion of the applied resin layer; and
applying a resin layer again on an upper portion of the resin layer where the at least one through-hole forming body has been arranged,
wherein the above additional steps are repeated at least once before exposing the applied resin layer to light using a mask, so as to form through-holes having different heights.

7. The method of claim 1, wherein at the step of arranging a plurality of through-hole forming bodies,
the through-holes forming bodies are arranged in a direction corresponding to a direction in which liquid crystal spreads when being filled.

8. The method of claim 2, wherein at the step of arranging a plurality of through-hole forming bodies,
the through-holes forming bodies are arranged in a direction corresponding to a direction in which liquid crystal spreads when being filled.

9. The method of claim 3, wherein at the step of arranging a plurality of through-hole forming bodies,
the through-holes forming bodies are arranged in a direction corresponding to a direction in which liquid crystal spreads when being filled.

10. The method of claim 4, wherein at the step of arranging a plurality of through-hole forming bodies,
the through-holes forming bodies are arranged in a direction corresponding to a direction in which liquid crystal spreads when being filled.

11. The method of claim 5, wherein at the step of arranging a plurality of through-hole forming bodies,
the through-holes forming bodies are arranged in a direction corresponding to a direction in which liquid crystal spreads when being filled.

12. The method of claim 6, wherein at the step of arranging a plurality of through-hole forming bodies,
the through-holes forming bodies are arranged in a direction corresponding to a direction in which liquid crystal spreads when being filled.

* * * * *